July 22, 1969  A. D. SWEDA ETAL  3,456,962
FOLDING SUPPORT
Filed Sept. 22, 1967  6 Sheets-Sheet 6
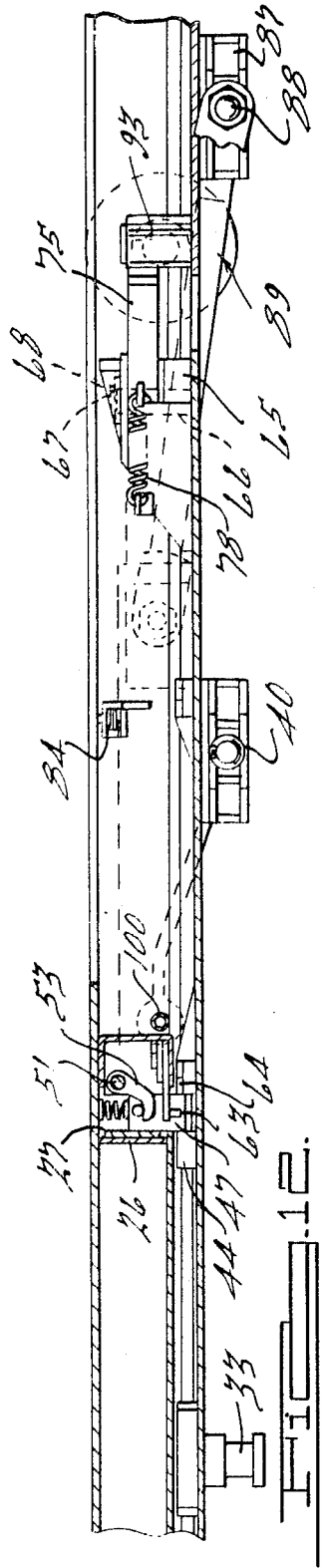
INVENTORS
Adam D. Sweda,
BY Floyd G. Saxton
Harness, Dickey & Pierce
ATTORNEYS United States Patent Office 3,456,962
Patented July 22, 1969

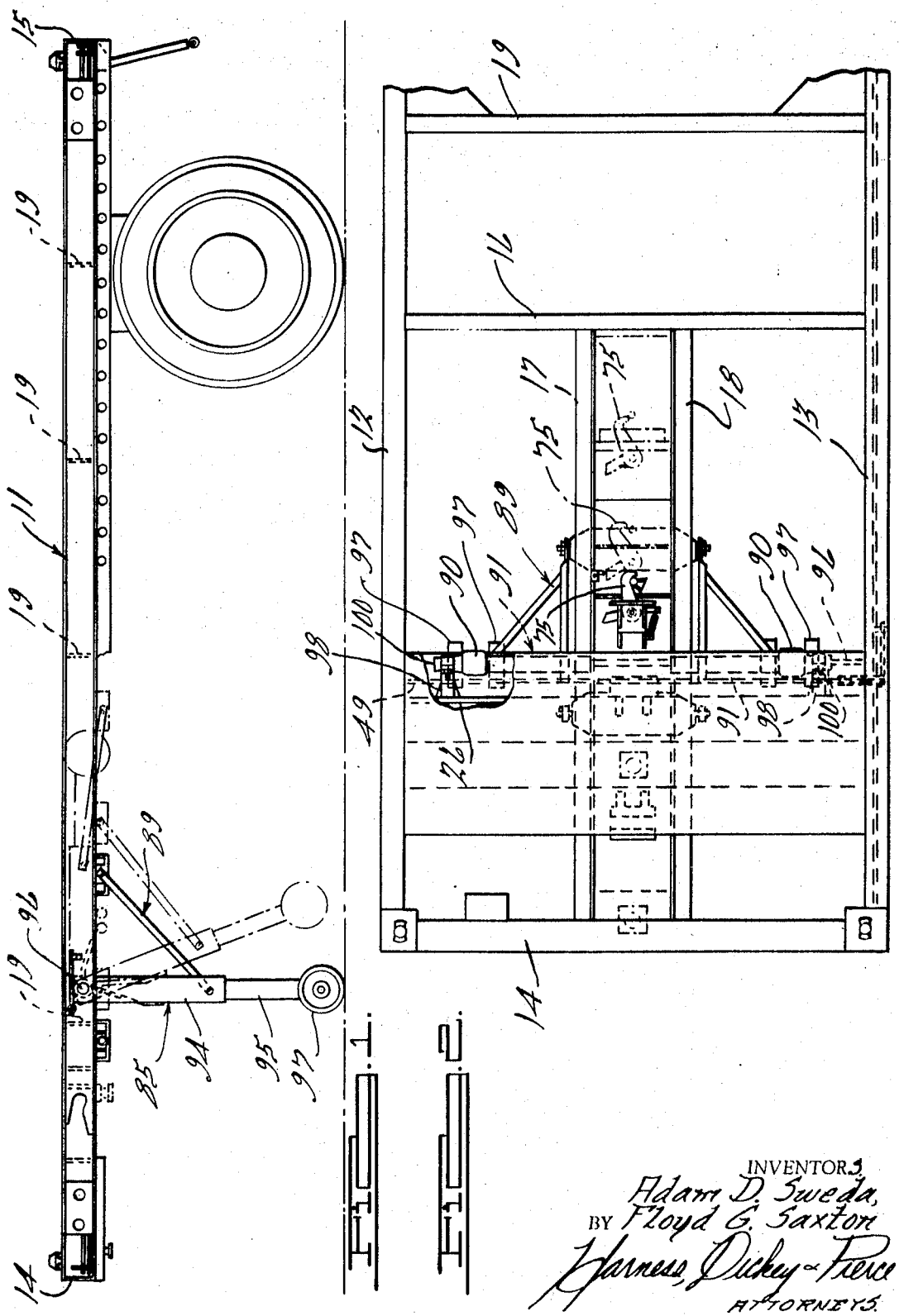

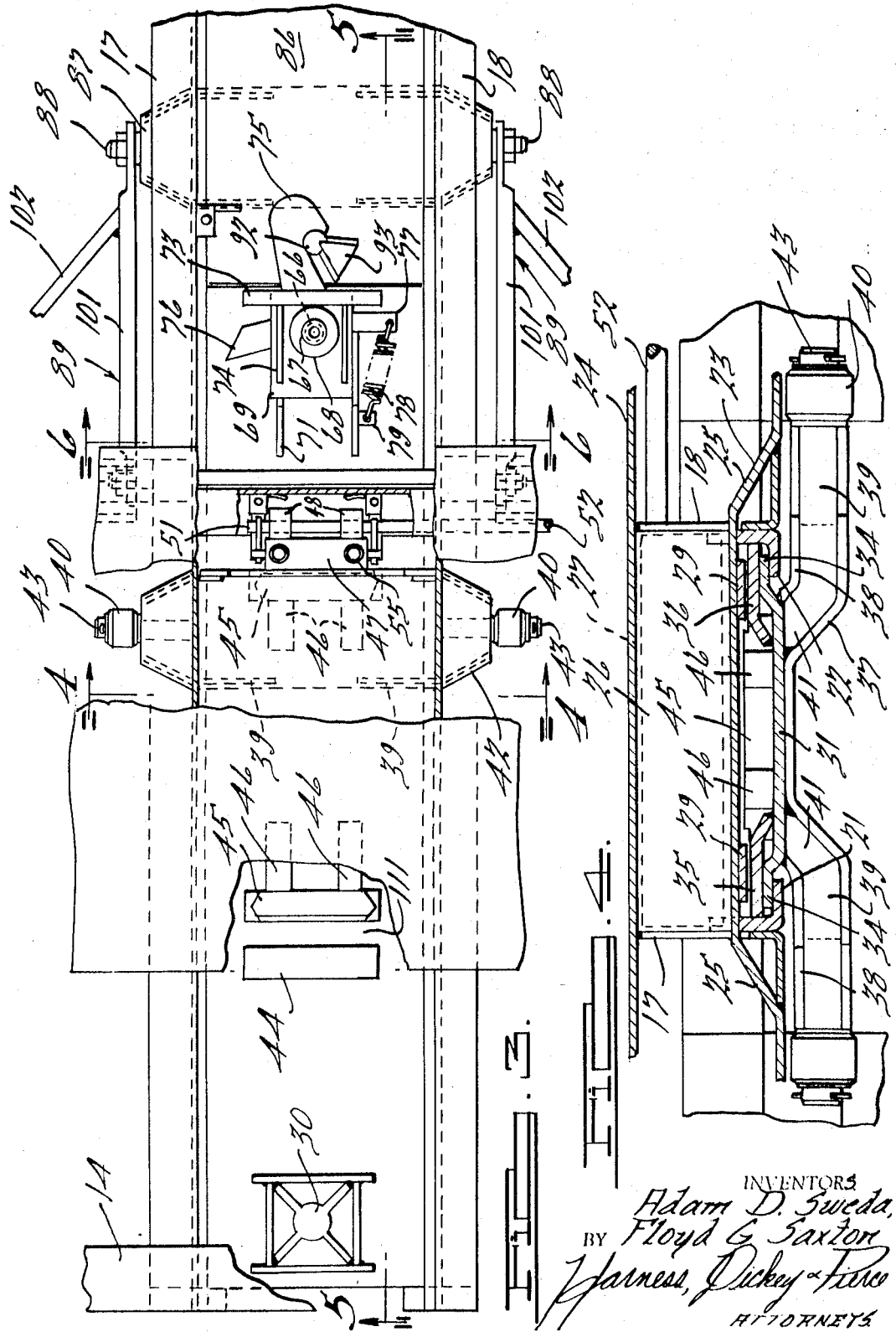

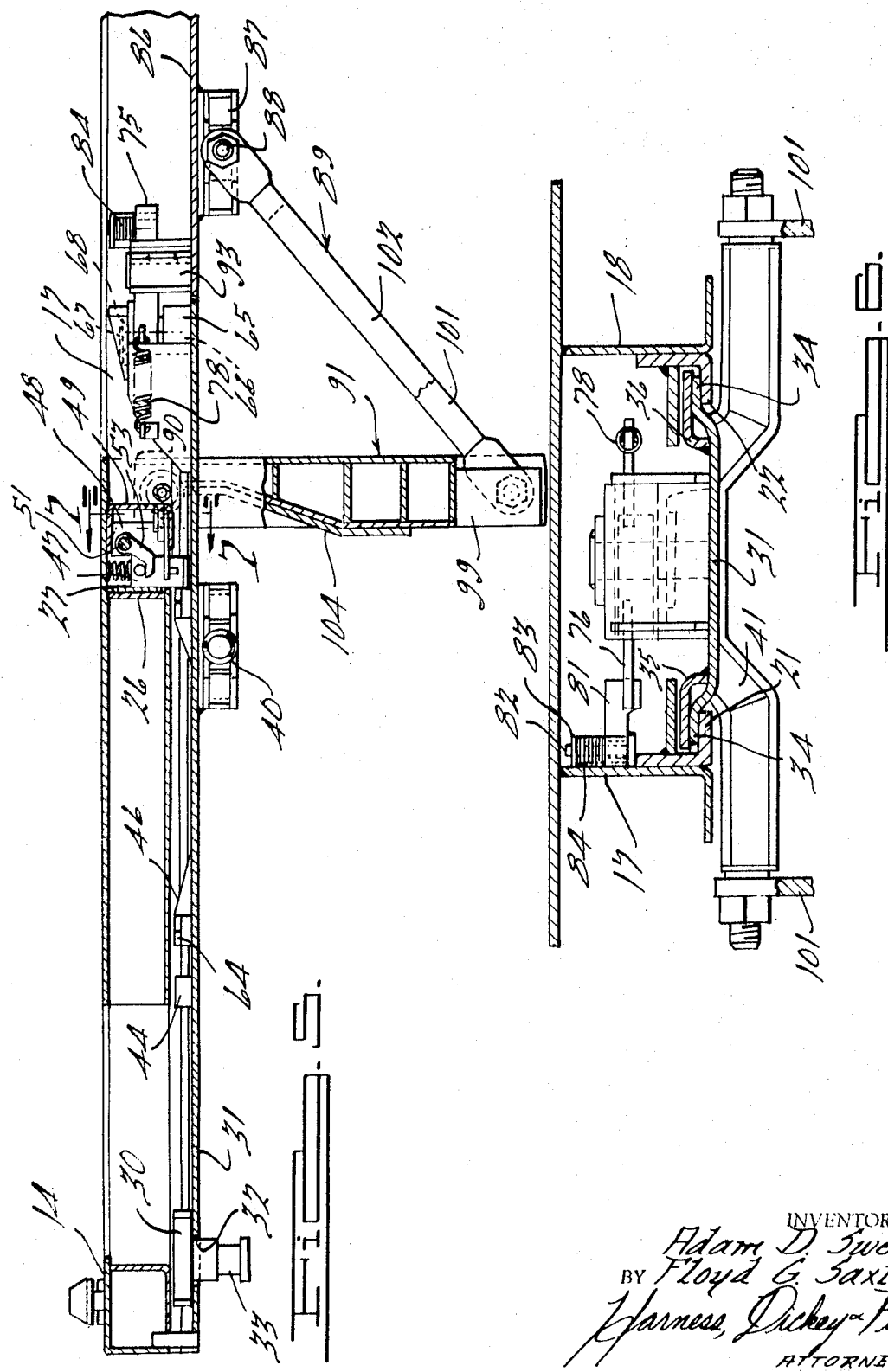

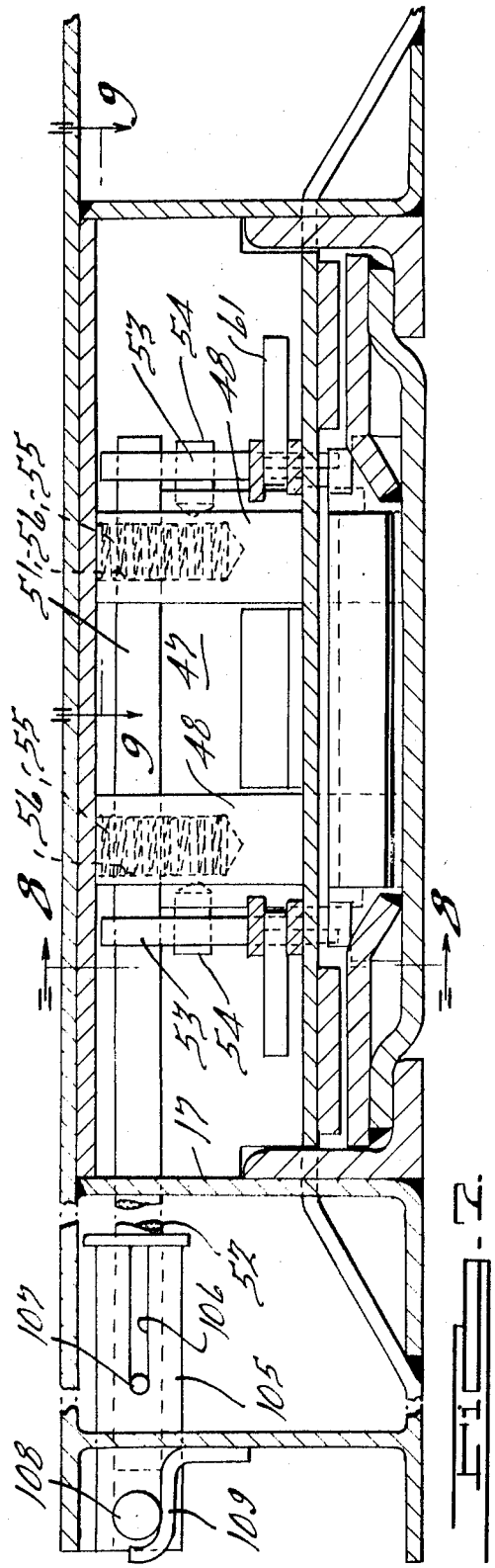
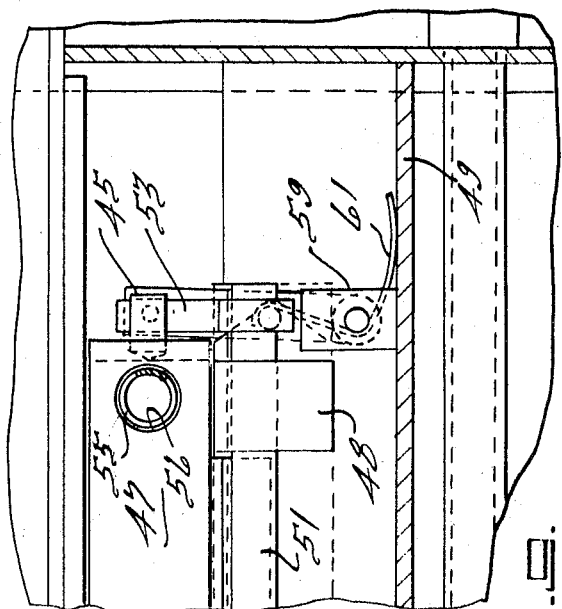
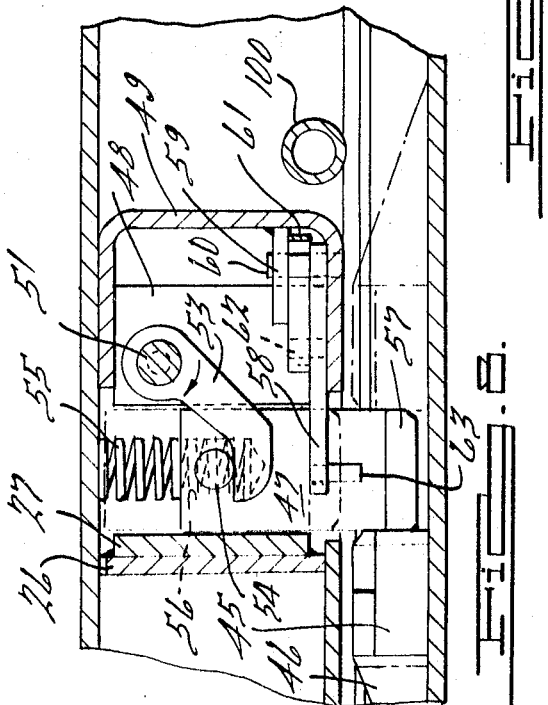

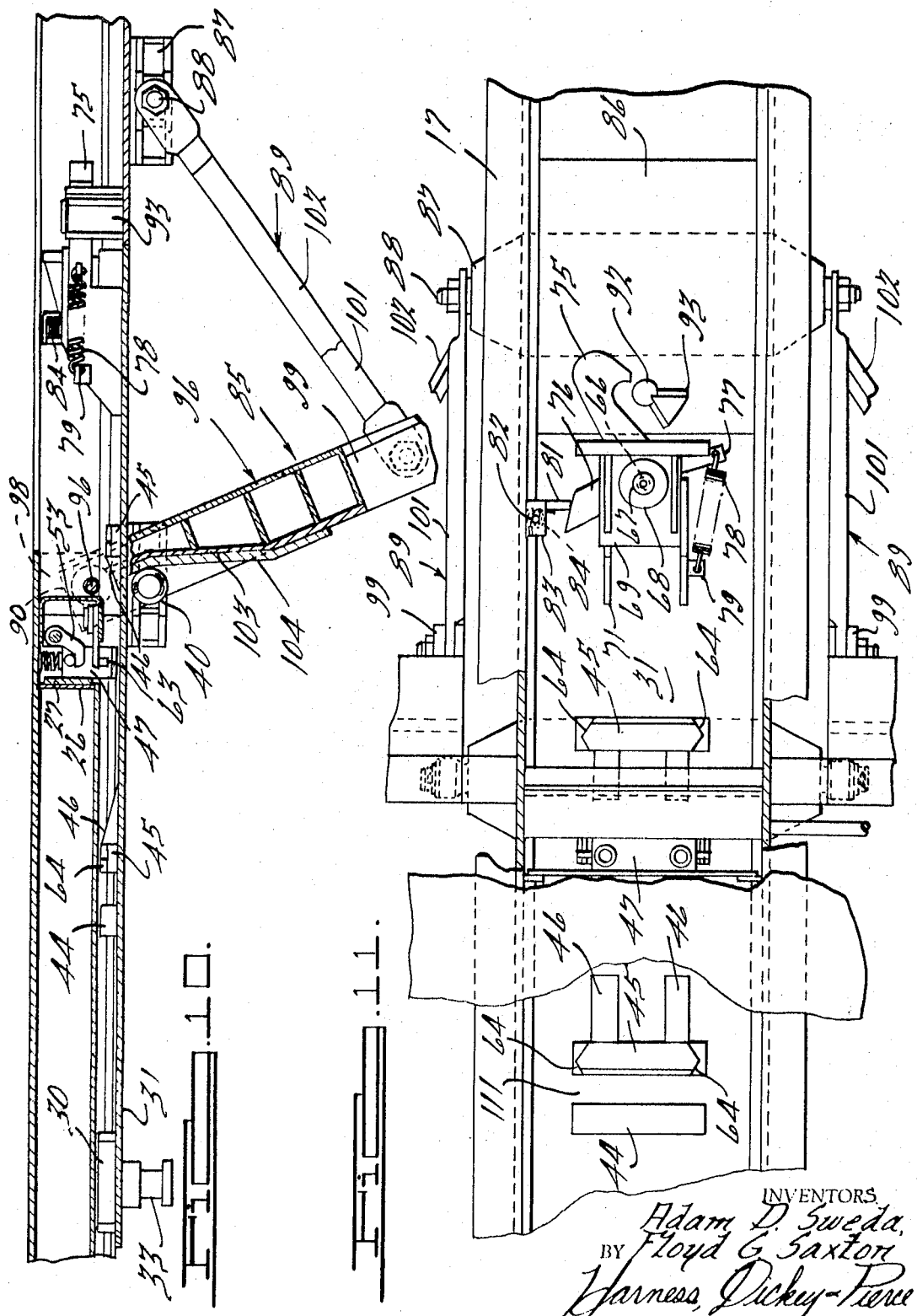

3,456,962
FOLDING SUPPORT
Adam D. Sweda, Grosse Pointe Farms, and Floyd G. Saxton, St. Clair Shores, Mich., assignors to Fruehauf Corporation, Detroit, Mich., a corporation of Michigan
Filed Sept. 22, 1967, Ser. No. 669,771
Int. Cl. B62d 53/06, 53/04
U.S. Cl. 280—430                                    7 Claims

ABSTRACT OF THE DISCLOSURE

A frame which functions as a chassis for a semitrailer has a collapsible landing gear and removable supporting wheels as well as attaching means for securing a body or container to the top thereof. The collapsible landing gear is positioned relatively close to the front end of the frame so that upon the movement of a kingpin and slide plate rearwardly, the landing gear will be moved thereby to raised position and moved to lowered position when the slide plate and kingpin are moved forwardly. The frame may have the wheels removed therefrom for storage or transportation by other media.

Background of the invention

The shifting of supporting wheels lengthwise of the frame and their separation therefrom as practiced by the present invention is old in the art. The frame is similar to that disclosed in the copending application to K. W. Tantlinger, Ser. No. 654,603, filed July 19, 1967, for "Coupled Chassis."

Summary of the invention

This invention pertains to a landing gear that is positioned relatively far forwardly of a trailer or frame to provide stability for the front end of the frame when supported by the landing gear. The actuating arms of the landing gear are pivoted to a rearwardly slidable plate which abuts a slidable plate on which the kingpin is mounted so as to be located at the forward end of the frame. The kingpin plate is locked in forward and rearmost positions and when in forward position is latched to a pin on the slidable plate of the landing gear for securing it in supporting position. The landing gear is initially swung from the ground when the kingpin plate is moved rearwardly by the tractor after engaging the kingpin and moving beneath the frame after which rollers on the kingpin plate swing the landing gear upwardly into stowed position after it is released from the kingpin plate. The landing gear is nested in the area within the thickness of the frame where it is retained by the rollers when the kingpin plate is locked in rearmost position. In this position the frame can function as a base or pallet for the container.

Brief description of the drawings

FIGURE 1 is a side view of a frame when supported upon a pair of wheels at the rear and a landing gear at the front with the kingpin in forwardmost position;

FIG. 2 is a plan view of the left-hand end of the frame illustrated in FIG. 1;

FIG. 3 is an enlarged broken view of the forward portion of the structure illustrated in FIG. 2;

FIG. 4 is an enlarged, broken sectional view of the structure illustrated in FIG. 3, taken on the line 4—4 thereof;

FIG. 5 is a sectional view of the structure illustrated in FIG. 3, taken on the line 5—5 thereof;

FIG. 6 is an enlarged sectional view of the structure illustrated in FIG. 3, taken on the line 6—6 thereof;

FIG. 7 is an enlarged, broken sectional view of the structure illustrated in FIG. 5, taken on the line 7—7 thereof;

FIG. 8 is a broken sectional view of the structure illustrated in FIG. 7, taken on the line 8—8 thereof;

FIG. 9 is a broken sectional view of the structure illustrated in FIG. 7, taken on the line 9—9 thereof;

FIG. 10 is a view of structure, similar to that illustrated in FIG. 5, after the initial movement of the kingpin and the landing gear;

FIG. 11 is a plan view of the structure illustrated in FIG. 10;

FIG. 12 is a view of the structure of FIG. 10, with the landing gear in nested relation within the frame, and FIG. 13 is a plan view of the structure illustrated in FIG. 12.

Description of the preferred embodiments of the invention

A frame 11 is made of side rails 12 and 13 and end rails 14 and 15. A cross rail 16 is interconnected by spaced rails 17 and 18 to the front end rail 14. Additional rails 19 interconnect the rails 12 and 13. Angle shaped track members 21 and 22 are secured on the inner face of the rails 17 and 18 both of which are cut away to receive a transverse plate 23 which is arched upwardly thereover, as clearly illustrated in FIG. 4. The downwardly sloping portions 25 of the plate 23 are extended at the bottom to engage the side rails 12 and 13 to which they are welded. A top plate 24 is mounted above the plate 23 and extends laterally into engagement with the top flange of the side rails 12 and 13 to which it is welded. The top of the rails 17 and 18 are welded to the plate in the portion which extends rearwardly beyond the plate 23. A vertical plate 26 is welded between the rails 17 and 18 and a heavy abutment plate 27 is welded thereto on the rear face thereof. The underface of the plate 23 above the horizontally extending portion of the track members 21 and 22 have thrust plates 29 welded thereto.

A slide plate 31 has an aperture 32 near its forward end through which a kingpin 33 extends having a base 30 on the top side which is welded to the plate. The slide plate 31 has upwardly offset side flanges 34 which rests upon the track members 21 and 22 and are reinforced by plates 35 and 36 which are welded thereto. The slide plate 31 has a plate 37 welded to the bottom thereof to extend downwardly and outwardly below plates 38 which are also secured to the slide plate 31. The plates 38 are spaced from the plate 37 by vertical plates 39 and 41 which are welded to the side edges thereof. The outer ends of the box section structure thus formed are tapered at 42 and have stub shafts 43 welded thereto. Each stub shaft 43 supports a roller 40 which is secured thereon by a washer and cotter pin. On the top of the slide plate 31 a stop block 44 is secured, spaced from an actuating block 45 having ramp blocks 46 in abutted relation thereto. A similar actuating block 45 and ramp blocks 46 are reversely disposed and secured to the slide plate 31 adjacent to the opposite end from that supporting the kingpin 33.

Referring more specifically to FIGS. 3 to 9, aligned with the plate 27 is a locking block 47 which is engaged by a pair of spaced blocks 48 carried by a channel element 49 between the spaced rails 17 and 18. The spaced blocks 48 support a shaft 51, one end 52 of which extends through the rail 17, as illustrated in FIG. 7. A pair of cam arms 53 are secured on the shaft on opposite ends of the locking block 47 in alignment with the pins 54 projecting from the ends thereof. Upon the rotation of the shaft 51 clockwise, the arms 53 will swing upwardly and move the pins 54 and the locking block 47 upwardly against the tension of a pair of springs 55 carried in apertures 56 in the block 47 and engaging the top plate 24. The bottom sides of the block 47 have recesses 57 into which arms 58 are urged when the block is raised to its uppermost position. The arms 58 are mounted on pivot pins 60 on the bottom web of the channel 49 which extend through fingers 59 secured to the web thereof. A flat spring 61 of S-shape engages the web of the channel 49 and extends about the pin 60 and a pin 62 on the arm 58 at each side of the block 47. A pin 63 extends downwardly from the outer end of each arm 58 for engagement by sloping cam surfaces 64 of the actuating block 45.

The end of the slide plate 31 opposite to that having a kingpin 33, has a block 65 on the top side containing an aperture for a pin 66 disposed in aligned apertures in a washer 68 and a top plate 69 and secured in position by a washer 67 welded to the washer 68. The plate rests upon a side plate 71 and is welded thereto and to the side of a stop plate 72. The front end of the plate 69 has a cross bar 73 braced by angle members 74 which are welded together. A hook 75 is pivoted on the pin 66 having a cam arm 76 and a stop arm 77, the latter being connected by a spring 78 to a finger 79 on the plate 72. The spring urges the hook 75 clockwise into latched position and is urged from latch position by the cam arm 76. When the slide plate 31 is moved rearwardly the sloping cam surface at the end of the arm 76 strikes a pawl 81 supported on a pin 82 in a bracket 83 on the rail 17. A coil spring 84 urges the pawl 81 counterclockwise to a position at right angles to the rail 17 in the path of movement of the sloping end of the cam arm 76. Upon the forward movement of the slide plate 31, the arm 76 will engage the pawl 81 and rotate it about the pin 82 without effecting the position of the hook 75.

The landing gear 85 has a slide plate 86 which is similar to the slide plate 31 having a frame 87 constructed in the same manner as the box section structure made up of the plates 37 and 38 for supporting the rollers 40. The frame 87 has studs 88 extending from the sloping ends and supported therein in the same manner as the stub shafts 39 which support the rollers. The studs 88 have V-shaped links 89 pivoted thereto and to opposite sides of frames 91 of the landing gear 85. The forward end of the slide plate 86 carries a latching pin 92 braced by plates 93. When the kingpin is in its forward position, as illustrated in FIG. 3, and the landing gear is in supporting position, the slide plates 86 and 31 are in a substantially abutting relation. The hook 75 is in engaged relation with the latch pin 92 and locks the landing gear in supporting position when the locking block 47 abuts the rearmost actuating block 45 and prevents the slide plates 31 and 86 from being moved.

The frames 91 have a pair of spaced tubes 94 at the outer ends with telescoping tubes 95 extending therefrom. A through shaft 96 operates through bevel gears or other means in a housing 90 at the upper end of tubes 94 for raising and lowering the tubes 95 within the tubes 94. The lower ends of the tubes 95 have a pair of wheels 97 for engagement with the ground. The housings 90 have a hollow shaft 100 pivoted in brackets 98 secured to the vertical plate 26. Spaced brackets 99 are secured to the bottom of the frame 91 to which the ends of the arms 101 and 102 of the links 89 are pivoted.

The inner edge of each frame 91 on the front side thereof has a sloping portion 103 reinforced by a plate 104 which are in a position to be engaged by the rollers 40. A tube 105 on the end 52 of the shaft 51 has a slot 106 therein through which a pin 107 on the shaft extends. The tube has a rod 108 extending outwardly at right angle thereto which is retained in inward position by a bracket 109. The rod is raised above the bracket and pulled outwardly so that the tube 105 and shaft 51 can be rotated. When rotated in a clockwise direction the cam arms 53 raise the pins 54 and the locking block 47 sufficiently to permit the arms 58 to move inwardly into the bottom notches 57 thereof and thereby retain the block in raised position above the stop block 44 and locking block 47. This releases the slide plate 31 and permits it to be moved backwardly by the rearward movement of the tractor or moved forwardly by the forward movement of the tractor.

The operation

With the rear wheels blocked, the locking block 47 in raised position and the skid plate of the tractor in engagement with the kingpin 33, the rearward movement of the tractor moves the slide plates 31 and 86 along therewith to initially swing the landing gear 85 rearwardly out of ground-engaging position. This initial movement advances the cam arm 76 of the hook 75 into engagement with the finger 81 to cause the hook to move counterclockwise out of engagement with the pin 92, as illustrated in FIG. 11. At this time the rollers 40 have engaged the reinforcing plates 104 of the landing gear and the further movement of the slide plate 31 causes the rollers to swing the landing gear upwardly and cause the slide plate 86 to move faster than the slide plate 31 away therefrom. FIGS. 12 and 13 illustrate the plate 86 at the end of its travel spaced from the plate 31 with the hook 75 disconnected from the pin 92 and the entire landing gear nested within the frame and retained therein by the rollers 40. During the initial rearward movement, the cam surfaces 64 of the rear block 45 engage the pins 63 and move the arms 58 outwardly to released position permitting the block 47 to drop onto the block 45 and move therefrom and down the ramp blocks 46.

Near the end of the rearward movement of the slide plate 31, the ramp blocks 46 on the front actuating block 45 moves the locking block 47 upwardly so that the block 45 can move thereunder. At the end of the rearward movement of the plate 31 the block 45 moves beyond the locking block 47 which drops into a slot 111 provided between the forward locking plate 44 and actuating block 45, as illustrated in FIGS. 11 to 13. This locks the slide plate 31 against forward and rearward movement and secures the kingpin 33 and the rollers 40 in fixed position.

When it is decided to lower the landing gear, handle 108 is again manipulated to raise the locking block 47 from the slot 111 to have it retained in raised position by the arms 58. The forward movement of the tractor carries the kingpin slide plate 31 and rollers 40 forwardly, the rollers permitting the landing gear 85 to swing downwardly and the slide plate 86 to move into engagement with the slide plate 31 at which time the hook 75 will swing over the pin 92 to permit the slide plate 31 to move the slide plate 86 forwardly along therewith. This will pull the ground-engaging wheels 97 of the landing gear 85 into ground engaged position, as illustrated in FIG. 1. During the initial forward movement, the cam surfaces 64 on the forward block 45 will engage the pins 63 and move the arms 58 outwardly to release the block 47 which drops onto the block 45 and moves down the ramp blocks 46. Thereafter, the rearmost ramp blocks 46 will raise the locking block 47 to permit the actuating block 45 to pass thereunder so that the block 47 can drop downwardly therebehind to lock the slide plates 31 and 86 from moving rearwardly. The forward motion of the slide plates 31 is arrested by a bar located in the front cross member 14 and since the slide plate 31 is secured against movement, the landing gear 85 is locked in ground engaged position through the engagement of the hook 75 with the pin 92. The tractor is then released from the kingpin 33 with the landing gear 85 in forwardmost position relative to the frame 11 to provide greater stability thereto when a container is being loaded on or unloaded from the front end thereof. When the landing gear is in raised position it is wholly retained within the frame 11 so that the frame can function as a base for the container when the wheels are removed and the container is to be stored or transported by rail, air or water.

What is claimed is:
1. In a frame, a landing gear pivoted on the front end thereof, a forwardly and rearwardly movable slide plate carried by the frame, a kingpin on said side plate for producing the forward and rearward movement thereof, means on the slide plate for swinging said landing gear rearwardly to a raised position in which it is retained when the slide plate and kingpin have been moved rearwardly, a second slide plate carried by the frame, links connecting the second slide plate to the landing gear, and releasable locking means for retaining the second slide plate in fixed relation to the kingpin slide plate.

2. In a frame as recited in claim 1, wherein means are provided for releasing the second slide plate from the kingpin slide plate after the initial movement thereof to permit the second slide plate to advance ahead of the kingpin slide plate by the operation of the rollers on the landing gear.

3. In a frame as recited in claim 2, wherein a locking block is movable vertically of the frame to lock the kingpin slide plate against rearward movement in one position of the kingpin slide plate and in a second position against the forward movement thereof.

4. In a frame as recited in claim 3, wherein the locking of the kingpin slide plate in rearward position locks the rollers in position to retain the landing gear within the frame.

5. In a frame as recited in claim 4, wherein means are provided for manually raising the locking block, and means for retaining the locking block in raised position.

6. In a frame as recited in claim 5, wherein means are provided on the kingpin slide plate for releasing the locking block after said kingpin slide plate has moved rearwardly or forwardly a predetermined distance to raise or lower the landing gear.

7. In a frame as recited in claim 6, wherein means are provided for raising said locking block to permit one or two stop blocks on the kingpin slide plate to pass thereunder and lock the kingpin slide plate against forward and rearward movement.

References Cited

UNITED STATES PATENTS

| | | | |
|---|---|---|---|
| 2,418,240 | 4/1947 | Starr | 280—430 |
| 2,434,443 | 1/1948 | Starr | 280—430 |
| 2,981,210 | 4/1961 | Krueger | 105—368 |
| 3,102,738 | 9/1963 | De Roshia | 280—415 |
| 3,154,319 | 10/1964 | Martin | 280—104.5 |
| 3,163,306 | 12/1964 | Bennett et al. | 214—515 |
| 3,317,219 | 5/1967 | Hindin et al. | 280—415 |

LEO FRIAGLIA, Primary Examiner

U.S. Cl. X.R.

280—415